United States Patent [19]

De Schepper et al.

[11] 4,088,733
[45] May 9, 1978

[54] PROCESS FOR LIQUID-LIQUID EXTRACTION OF COBALT FROM NICKEL

[75] Inventors: Achille De Schepper, Berkenlaan; Antoine Van Peteghem, Lichtaart, both of Belgium

[73] Assignee: Metallurgie Hoboken-Overpelt, Brussels, Belgium

[21] Appl. No.: 660,546

[22] Filed: Feb. 23, 1976

[51] Int. Cl.² .................... C01G 51/10; C22B 23/04
[52] U.S. Cl. ............................ 423/139; 75/101 BE; 75/119; 423/544
[58] Field of Search ....................... 75/101 BE, 119; 423/139, 544

[56] References Cited

U.S. PATENT DOCUMENTS

| | | | |
|---|---|---|---|
| 3,399,055 | 8/1968 | Ritcey et al. | 75/119 |
| 3,455,680 | 7/1969 | Ashbrook et al. | 75/119 X |
| 3,869,360 | 3/1975 | Kane et al. | 75/101 BE |
| 3,941,793 | 3/1976 | Ackerley et al. | 75/101 BE |

*Primary Examiner*—G. Ozakt
*Attorney, Agent, or Firm*—Fred Philpitt

[57] ABSTRACT

A process for separating cobalt from nickel in an aqueous acid solution containing the above metals, which comprises contacting said solution with an organic phase comprising (a) 65-98% by volume of a concentrated alpha-hydroxyoxime extractant, a 1% by volume solution of which in xylene has per liter a maximum loading capacity of about 0.864 g. of copper, and (b) 2-35% by volume of an organophosphoric acid of the general formula:

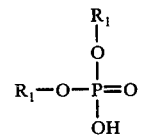

wherein $R_1$ represents an alkyl, aryl or aralkyl radical, while maintaining the pH of said solution between 1 and 6, whereby cobalt is extracted from the aqueous phase to the organic phase and separating the resultant cobalt pregnant organic phase from the aqueous phase.

8 Claims, No Drawings

PROCESS FOR LIQUID-LIQUID EXTRACTION OF COBALT FROM NICKEL

The present invention relates to a process for removing cobalt by liquid-liquid extraction from an aqueous acid solution containing cobalt and nickel.

The process of the invention is particularly interesting when treating solutions containing nickel and cobalt as sulphates because up to now, the elimination of the cobalt from such solution by liquid-liquid extraction was carried out by more expensive and less selective processes.

For instance it is well known to extract cobalt from sulphate solutions with sulfonium thiocyanate diluted in diisobutylcetone; however, this process presents the drawback that the extractant is too soluble in water.

It is also known to extract cobalt from a sulphate solution containing approximately 5.1 g. Co/1 and 2.8 g. Ni/1 with an organic liquid consisting of a 10% by volume di(2-ethylhexyl) phosphoric acid plus 10% by volume "LIX-63" solution in an inert solvent called "140 Flash Naphtha", "LIX-63" being an alpha-hydroxyoxime extractant sold by General Mills Inc., in which the alpha-hydroxyoxime has the general formula

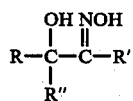

wherein R and R' represent hydrocarbon radicals and R" an hydrocarbon radical or hydrogen.

This process has however the disadvantage that it is difficult to re-extract the cobalt from the organic liquid; in this respect, reference is made to the last but one paragraph of the article published by the review "C.I.M. Bulletin", February 1974, pages 87–92.

It has now been found that the difficulties inherent to the known processes may be avoided.

The present invention relates to a process for removing cobalt from an aqueous solution containing cobalt and nickel by liquid-liquid extraction, in which the extraction is carried out with an organic liquid comprising 65–98% by volume of a concentrated alpha-hydroxyoxime extractant as hereinafter defined and 2–35% by volume of an organophosphoric acid of the general formula

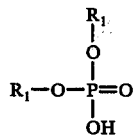

wherein $R_1$ represents an alkyl, aryl or aralkyl radical, the pH of the solution being maintained at a value of between 1 and 6.

Under the expression "concentrated alpha-hydroxyoxime extractant" it is understood the product which is available from General Mills Inc. under the trademark "LIX-63" or any product which has substantially the same composition and the same properties as "LIX-63". The alpha-hydroxyoxime present in "LIX-63" has been disclosed in U.S. Pat. No. 3,224,873 assigned to General Mills and "LIX-63" is characterized in that a 1% by volume solution thereof in xylene has per liter a maximum loading capacity of 0.864 g. of copper (Transactions Society of Mining Engineers, AIME, vol. 254, December 1973, p. 254, table 2).

Thus, the organic liquid used for extracting cobalt according to the present invention may consist, e.g., of 98% by volume of "LIX-63" and 2% by volume of an organophosphoric acid of the given formula, or of 65% by volume of "LIX-63" and 35% by volume of an organophosphoric acid of the given formula, or of 65% by volume of "LIX-63", 2% by volume of an organophosphoric acid of the given formula and 33% by volume of an inert organic diluent, or of between 65 and 98% by volume of "LIX-63", between 2 and 35% by volume of an organophosphoric acid of the given formula and between 0 and 33% by volume of an inert organic diluent.

It is only critical that the organic liquid contains at least 65% by volume of a concentrated alpha-hydroxyoxime extractant such as "LIX-63" and at least 2% by volume of an organophosphoric acid of the given formula, and that the pH of the solution is maintained between 1 and 6.

If the organic liquid contains less than 65% by volume of the concentrated alpha-hydroxyoxime extractant, re-extraction yield for cobalt is low.

Below an organophosphoric acid content of 2% by volume, cobalt is extracted almost completely only at a pH value of above 6, where nickel is co-extracted to a great extent.

Below pH 1 cobalt cannot be extracted, whereas above pH 6 nickel is coextracted to a great extent. For maintaining the pH within the critical range, a neutralizing agent in dissolved or in solid state or in pulp may be used.

If an inert organic diluent is used, it should of course, be water immiscible. Suitable diluents include aliphatic and aromatic hydrocarbons such as benzene, toluene, xylene, fuel oil and kerosene.

It is particularly advantageous to add at least 2% by volume of trichloroethylene to the organic liquid, since such addition has been found to protect the alpha hydroxyoxime from losing rapidly its extractive power during the further re-extraction with acid. If trichloroethylene is not present in the organic liquid, that extractive power has to be often restored by washing the extractant with water or an alkaline solution.

However, it is not recommended to add more than 20% by volume of trichloroethylene, since losses by volatilization then become high. Trichloroethylene also acts as diluent.

Advantageously di(2-ethylhexyl) phosphoric acid will be used as the organophosphoric acid.

It may be useful to add an emulsion inhibitor to the said organic liquid, preferably a long chain aliphatic alcohol such as isodecanol.

The pH of said aqueous solution is preferably maintained between 2.5 and 4.5.

After extraction, the cobalt may be reextracted from the organic liquid with an aqueous acid solution, the acidity of which is comprised between 1 and 6 N. The thus decobaltized organic liquid may be treated with an aqueous acid solution, the acidity of which is superior to 6.9 N, to re-extract the minor quantity of nickel which has been co-extracted with the cobalt. For the re-extraction, solutions of hydrochloric or sulphuric acid will advantageously be used.

The above described process is also suitable for the treatment of solutions other than sulphates, for instance chloride solutions.

The following examples will further explain the process of the invention.

EXAMPLE 1

An aqueous solution containing 100 g/liter Ni and 20 g/liter Co as sulphates is treated with an organic solution containing 80% by volume of "LIX 63" and 20% by volume of di(2-ethylhexyl) phosphoric acid ; the pH of the solution is maintained at 4 and the ratio organic phase / aqueous phase (0:A) is equal to 1.

The obtained raffinate contains 90 g/liter Ni and 2 g/liter Co, which corresponds to an extraction yield of 10% for the nickel and 90% for the cobalt.

EXAMPLE 2.

The aqueous solution of example 1 is treated with an organic liquid containing 80% by volume of "LIX 63", 15% by volume of di(2-ethylhexyl) phosphoric acid and 5% by volume trichloroethylene ; the pH of the solution is maintained at 4 and the ratio 0:A is equal to 1.

The raffinate contains 92 g/liter Ni and 0.75 g/liter Co, which corresponds to an extraction yield of 8% for the nickel and 96.25% for the cobalt.

The cobalt is re-extracted from the organic phase with 4 N hydrochloric acid, with a ratio 0:A = 2. The obtained eluate contains in g/liter : 38.4 Co and 0.5 Ni.

The nickel is re-extracted from the decobaltized organic phase with 700 g/liter sulphuric acid, with a ratio 0:A = 2. The obtained eluate contains in g/liter : 0.09 Co and 15.45 Ni. By concentrating this eluate, for instance to 1:100 g/liter sulphuric acid, very pure $NiSO_4$ crystals are obtained and also an acid which may be recycled towards the elution section.

What we claim is:

1. A process for separating cobalt from nickel in an aqueous acid solution containing the above metals, which comprises contacting said solution with an organic phase comprising (a) 65–98% by volume of a concentrated alpha-hydroxyoxime extractant, and
(b) 2–35% by volume of an organophosphoric acid of the general formula:

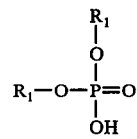

wherein $R_1$ represents an alkyl, aryl or aralkyl radical, while maintaining the pH of said solution between 1 and 6, whereby cobalt is extracted from the aqueous phase to the organic phase and separating the resultant cobalt pregnant organic phase from the aqueous phase.

2. A process according to claim 1 wherein the organic phase comprises 2–20% by volume of trichloroethylene.

3. A process according to claim 1 wherein the organophosphoric acid is di(2-ethylhexyl) phosphoric acid.

4. A process according to claim 1 wherein the organic phase contains an emulsion inhibitor.

5. A process according to claim 1 wherein the organic phase contains isodecanol as emulsion inhibitor.

6. A process according to claim 1 wherein the pH of the solution is maintained between 2.5 and 4.5.

7. A process according to claim 1 wherein the cobalt is stripped from the organic phase by treatment with an aqueous acid solution, the acidity of which is between 1 and 6N.

8. A process according to claim 1 wherein the cobalt is stripped from the organic phase by treatment with an aqueous acid solution, the acidity of which is between 1 and 6 N, and the docobaltized organic phase is then treated with an aqueous acid solution, the acidity of which is greater than 6 N to strip the minor quantity of nickel which has been co-extracted with the cobalt.

* * * * *